(12) United States Patent
Kim

(10) Patent No.: US 9,298,315 B2
(45) Date of Patent: Mar. 29, 2016

(54) DISPLAY DEVICE INCLUDING PHOTO SENSOR AND DRIVING METHOD THEREOF

(75) Inventor: Hee Joon Kim, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 624 days.

(21) Appl. No.: 13/588,960

(22) Filed: Aug. 17, 2012

(65) Prior Publication Data

US 2013/0257833 A1    Oct. 3, 2013

(30) Foreign Application Priority Data

Mar. 29, 2012    (KR) .................... 10-2012-0032639

(51) Int. Cl.
G09G 3/36        (2006.01)
H04N 3/14        (2006.01)
G06F 3/042       (2006.01)
G09G 3/20        (2006.01)

(52) U.S. Cl.
CPC .............. *G06F 3/042* (2013.01); *G09G 3/2022* (2013.01); *G09G 3/3648* (2013.01); *G09G 2310/0237* (2013.01); *G09G 2360/144* (2013.01); *G09G 2360/145* (2013.01)

(58) Field of Classification Search
CPC ............... G09G 2360/144; G09G 2320/0626; G09G 3/20; G09G 3/3406
See application file for complete search history.

(56) References Cited

U.S. PATENT DOCUMENTS

| 2002/0105509 A1 | 8/2002 | Johnson et al. |
| 2007/0146282 A1* | 6/2007 | Choo et al. ....................... 345/98 |
| 2011/0096021 A1 | 4/2011 | Kim et al. |
| 2011/0109609 A1 | 5/2011 | Jeong et al. |
| 2011/0128428 A1* | 6/2011 | Takatoku et al. ............. 348/307 |
| 2011/0279414 A1 | 11/2011 | Noma et al. |
| 2012/0262384 A1 | 10/2012 | Kim |
| 2013/0120332 A1* | 5/2013 | Tanaka et al. ................. 345/207 |
| 2013/0162602 A1* | 6/2013 | Nakagawa et al. ........... 345/175 |

FOREIGN PATENT DOCUMENTS

| JP | 4363314 | 8/2009 |
| JP | 4553710 | 7/2010 |
| KR | 1020100023230 A | 3/2010 |
| KR | 1020100086878 A | 8/2010 |
| KR | 1020110058333 A | 6/2011 |
| KR | 1020110100872 A | 9/2011 |
| KR | 101088113 | 11/2011 |

OTHER PUBLICATIONS

Tanaka et al., "The Technologies of In-Cell Optical Touch Panel with Novel Input Functions", journal of the SID 19/1, 2011.

* cited by examiner

*Primary Examiner* — Lixi C Simpson
*Assistant Examiner* — Ngan Pham Lu
(74) *Attorney, Agent, or Firm* — Innovation Counsel LLP

(57) ABSTRACT

Provided is a display device including a photo sensor and a driving method. The display device includes a first sensing unit and a second sensing unit that sense light, at least one sensing signal line that is connected with the first sensing unit and the second sensing unit and transmits a reference voltage for resetting the first sensing unit and the second sensing unit, a sensing signal processor that processes a sensing signal from the sensing signal line, and a backlight that irradiates internal light toward the first sensing unit and the second sensing unit during an internal light irradiation period which is repeated per frame, in which the first sensing unit is reset once and the second sensing unit is reset at least three times during each frame.

28 Claims, 10 Drawing Sheets

(a)

(b)

DISPLAY DEVICE INCLUDING PHOTO SENSOR AND DRIVING METHOD THEREOF

CROSS-REFERENCE TO RELATED APPLICATION

This application claims priority to, and the benefit of, Korean Patent Application No. 10-2012-0032639 filed in the Korean Intellectual Property Office on Mar. 29, 2012, the entire contents of which are incorporated herein by reference.

BACKGROUND OF THE INVENTION (a) Field of the Invention

Embodiments of the present invention relate generally to flat panel displays. More specifically, embodiments of the present invention relate to a display device including a photo sensor and a driving method therefor.

(b) Description of the Related Art

Various kinds of flat panel displays have been developed for various uses. Particularly, display devices having a touch sensing function or an image sensing function have been developed.

In general, touch-sensitive displays often employ a touch screen panel capable of sensing a contact, where this panel is attached to the display device. However, such configurations often suffer from high cost, yield reduction due to addition of an adhesion process, luminance deterioration of the display panel, and the like. Accordingly, a technology for embedding a sensor into the display area of the display device has been developed. The embedded sensor often employs a thin film transistor or capacitor, outputs a sensing signal according to change in irradiated light due to an external contact and the like, and determines contact information such as a contact position of an object, intensity of contact, and the like by using the sensing signal.

One such sensor is a photo sensor, i.e. a sensor sensing change in light, which may generate a sensing signal by using photocurrent generated by incident light and may acquire contact information by using the sensing signal. The light sensed by the sensor may be lights having various frequencies such as infrared light, visible light, and the like, and a light source generating the light sensed by the sensor may be positioned in the display device. For example, a backlight, which is an internal light source for displaying an image of the display device, may be configured so as to emit light having a wavelength suitable for the photo sensor in addition to visible light. However, the photo sensor may be influenced by light from an additional exterior light source and as a result, inexact contact information may be acquired.

Furthermore, photo sensors typically employ a photosensitive transistor. This transistor is a three-terminal element that determines whether or not contact exists via a photocurrent formed by irradiating light upon the channel part of the transistor. However, even when no light shines upon the photo sensor, photo leakage current may be present and, as a result, an error in the contact information may occur.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a display device including a photo sensor capable of obtaining more precise contact information, as well as a driving method therefor.

An exemplary embodiment of the present invention provides a display device, including: a first sensing unit and a second sensing unit each configured to sense light, at least one sensing signal line that is connected with the first sensing unit and the second sensing unit and that is configured to transmit a reference voltage for resetting the first sensing unit and the second sensing unit, a sensing signal processor configured to process a sensing signal from the sensing signal line, and a backlight configured to irradiate internal light toward the first sensing unit and the second sensing unit during an internal light irradiation period which is repeated per frame, in which the first sensing unit is reset once and the second sensing unit is reset at least three times during each frame.

The first sensing unit may be reset during a first output period which does not overlap the internal light irradiation period so as to output the sensing signal to the sensing signal line.

The second sensing unit may be reset in at least one preceding reset period, a main reset period, and a second output period which occur sequentially.

The second output period and the main reset period may or may not overlap the internal light irradiation period.

A first sensing period, that is between two adjacent first output periods for the first sensing unit, may overlap the internal light irradiation period, and a second sensing period, that is between the main reset period and an adjacent one of the second output periods, may not overlap the internal light irradiation period.

The display device may further include a first scanning signal line configured to transmit a scanning signal to the first sensing unit; and a second scanning signal line configured to transmit a scanning signal to the second sensing unit. Each of the first sensing unit and the second sensing unit may include a switching element connected with the first scanning signal line or the second scanning signal line, and a sensing element and a capacitor that are connected with the switching element. When the first sensing unit or the second sensing unit is reset, the reference voltage may be transmitted to the sensing element and the capacitor through the switching element.

An input terminal of the sensing element included in the first sensing unit may be connected with a first source voltage line configured to transmit a predetermined first voltage, and an input terminal of the sensing element included in the second sensing unit may be connected with a second source voltage line configured to transmit the first voltage and a second voltage which is different from the first voltage.

A first period, in which a voltage of the second source voltage line is the second voltage, may overlap the internal light irradiation period.

The second voltage may be substantially equal to the reference voltage.

Another exemplary embodiment of the present invention provides a method of driving a display device including a first sensing unit and a second sensing unit each configured to sense light, and at least one sensing signal line connected with the first sensing unit and the second sensing unit. The method includes: irradiating light from the display device toward the first sensing unit and the second sensing unit during an internal light irradiation period which is repeated for each of a number of frames; resetting the first sensing unit once during one frame so as to transmit a reference voltage transmitted from the sensing signal line to the first sensing unit; and resetting the second sensing unit at least three times during one frame so as to transmit the reference voltage to the second sensing unit.

The resetting the first sensing unit may be performed during a first output period which does not overlap the internal light irradiation period.

The resetting the second sensing unit may be performed in at least one preceding reset period, a main reset period, and a second output period which occur sequentially.

The second output period and the main reset period may not overlap the internal light irradiation period.

A first sensing period, that is between two adjacent first output periods, may overlap the internal light irradiation period, and a second sensing period, that is between the main reset period and an adjacent one of the second output periods, may not overlap the internal light irradiation period.

The display device may further include a first scanning signal line configured to transmit a scanning signal to the first sensing unit, and a second scanning signal line configured to transmit a scanning signal to the second sensing unit. Each of the first sensing unit and the second sensing unit may include a switching element connected with the first scanning signal line or the second scanning signal line, and a sensing element and a capacitor that are connected with the switching element. When the first sensing unit or the second sensing unit is reset, the reference voltage may be transmitted to the sensing element and the capacitor through the switching element.

An input terminal of the sensing element included in the first sensing unit may be connected with a first source voltage line configured to transmit a predetermined first voltage, and an input terminal of the sensing element included in the second sensing unit may be connected with a second source voltage line configured to transmit the first voltage and a second voltage which is different from the first voltage.

A first period, in which a voltage of the second source voltage line is the second voltage, may overlap the internal light irradiation period.

The second voltage may be substantially equal to the reference voltage.

According to the exemplary embodiments of the present invention, it is possible to acquire more exact contact information in which noise due to exterior light is substantially removed.

DETAILED DESCRIPTION OF THE EMBODIMENTS

Figure 1:
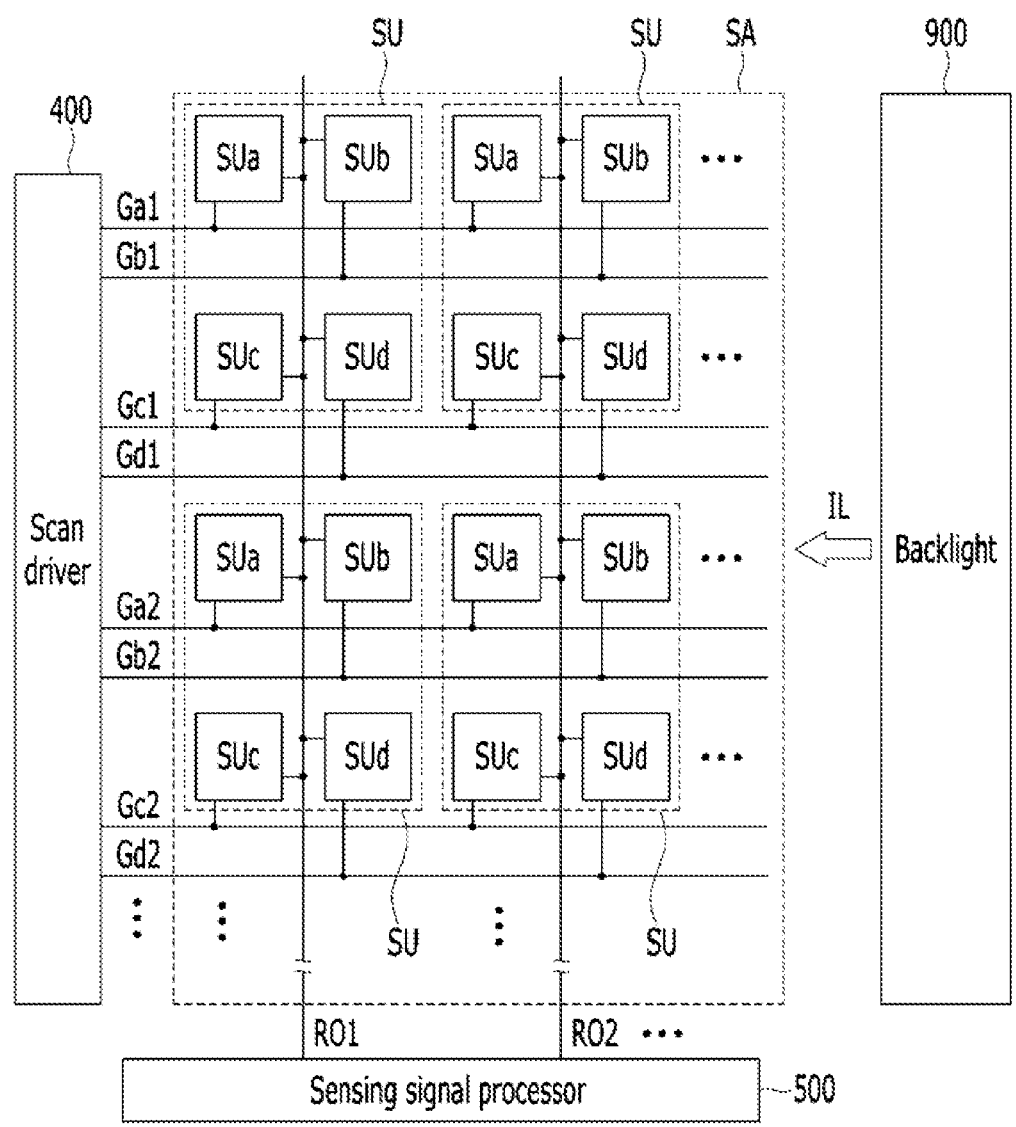
FIG. 1 is a block diagram of a display device including a photo sensor according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

First, a display device including a photo sensor according to an exemplary embodiment of the present invention will be described with reference to FIGS. 1 to 4.

Figure 2:
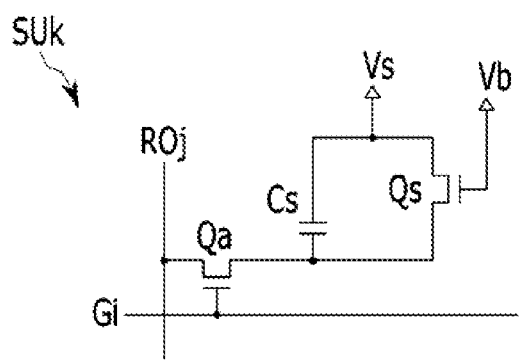
FIG. 2 is a circuit diagram of a photo sensor or a sensing unit according to the exemplary embodiment of the present invention.
Figure 2:
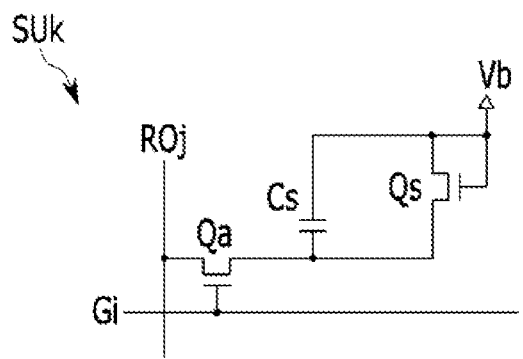
Figure 3:
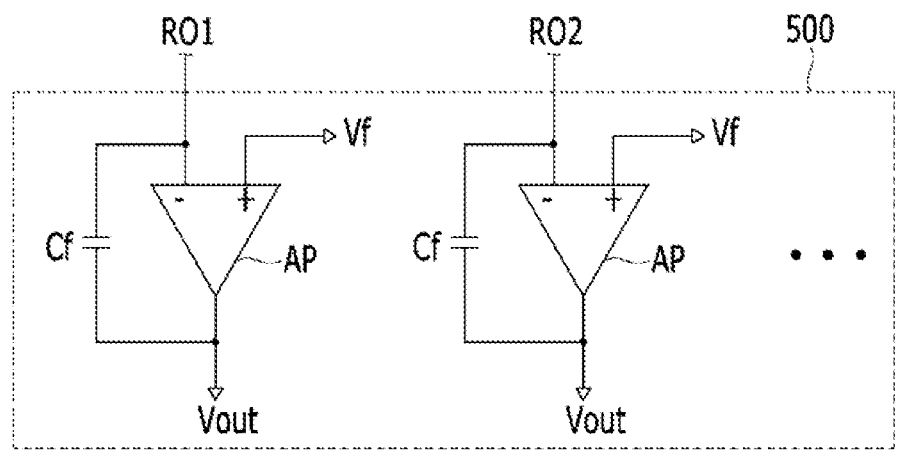
FIG. 3 is a circuit diagram of a sensing signal processor according to the exemplary embodiment of the present invention.
Figure 4:
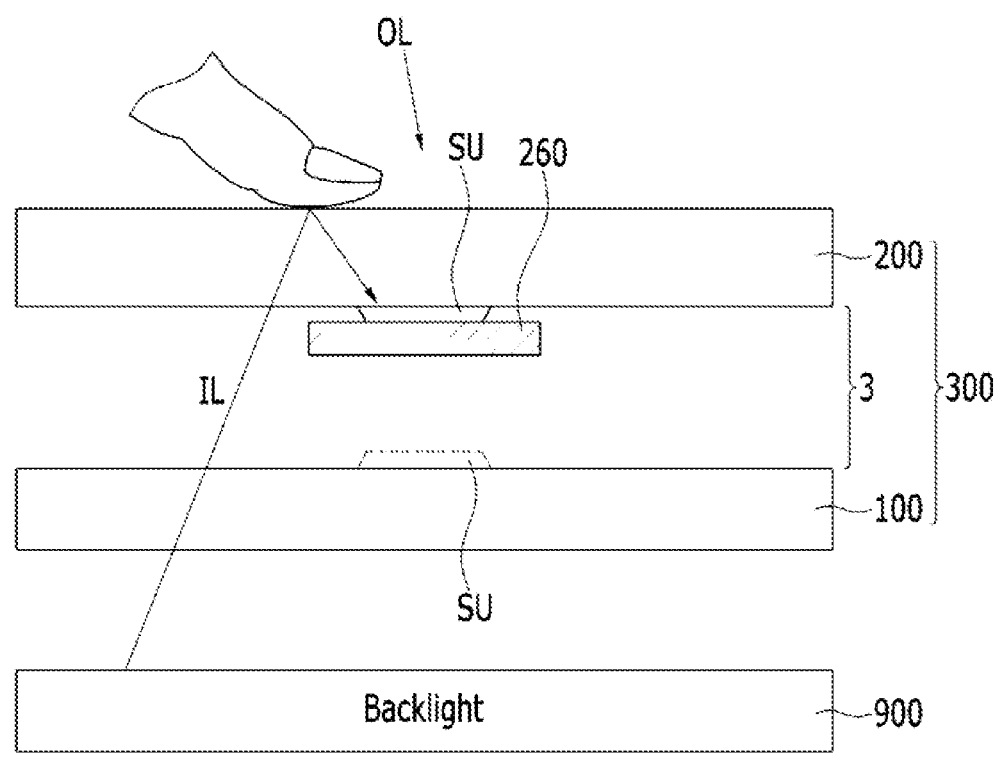
FIG. 4 is a cross-sectional view of a display device including a photo sensor according to the exemplary embodiment of the present invention.

FIG. 1 is a block diagram of a display device including a photo sensor according to an exemplary embodiment of the present invention, FIG. 2 is a circuit diagram of a photo sensor or a sensing unit according to the exemplary embodiment of the present invention, FIG. 3 is a circuit diagram of a sensing signal processor according to the exemplary embodiment of the present invention, and FIG. 4 is a cross-sectional view of a display device including a photo sensor according to the exemplary embodiment of the present invention.

Referring to FIG. 1, a touch-sensitive display device according to an exemplary embodiment of the present invention includes a sensing area SA, a backlight 900, a scan driver 400, and a sensing signal processor 500.

The sensing area SA is an area capable of sensing a change in light due to touch or access of an external object. The sensing area SA includes a plurality of scanning signal lines Ga1, Gb1, Gc1, Gd1, Ga2, Gb2, Gc2, Gd2, . . . , a plurality of sensing signal lines RO1, RO2, . . . , and a plurality of sensing unit groups SU (also referred to as sensor groups) which are arranged substantially in a matrix form.

The sensing area SA may correspond to a display area (not shown) in which a plurality of pixels (not shown) disposed on a display panel of the display device are arranged. The plurality of pixels may be connected to a plurality of image scanning signal lines transmitting scanning signals for displaying an image, and image data lines transmitting image data signals.

The plurality of scanning signal lines (also referred to as "gate lines") transmit the scanning signals (alternately, gate signals) and may extend substantially in a row direction. The plurality of scanning signal lines Ga1, Gb1, Gc1, Gd1, Ga2, Gb2, Gc2, Gd2, . . . may be divided into a plurality of scanning signal line groups which may independently transmit the scanning signals in sequence. In detail, the plurality of scanning signal lines Ga1, Gb1, Gc1, Gd1, Ga2, Gb2, Gc2, Gd2, . . . may include a first scanning signal line group (Ga1, Ga2, . . . ), a second scanning signal line group (Gb1, Gb2, . . . ), a third scanning signal line group (Gc1, Gc2, . . . ), and a fourth scanning signal line group (Gd1, Gd2, . . . ). The scanning signals of the first scanning signal line group (Ga1, Ga2, . . . ), the second scanning signal line group (Gb1, Gb2, . . . ), the third scanning signal line group (Gc1, Gc2, . . . ), and the fourth scanning signal line group (Gd1, Gd2, . . . ) may be sequentially and alternately arranged, as shown in FIG. 1.

In the exemplary embodiment shown in FIG. 1, the four kinds of scanning signal line groups are shown, but the layout and distribution of the scanning signal line groups is not limited thereto and may, for example, be configured with two kinds or more of scanning signal line groups.

A plurality of sensing signal lines (also referred to as "sensing data lines") extend substantially in a row direction and may cross the scanning signal lines Ga1, Gb1, Gc1, Gd1, Ga2, Gb2, Gc2, Gd2, . . . . The sensing signal lines RO1, RO2, . . . may receive a predetermined reference voltage Vf, and each of a plurality of sensing units (also referred to as photo sensors) SUa, SUb, SUc, and SUd included in the sensing unit group SU may transmit output sensing signals to the sensing signal processor 500.

Each sensing unit group SU may include at least two sensing units or photo sensors. FIG. 1 shows an example in which one sensing unit group SU includes four kinds of sensing units SUa, SUb, SUc, and SUd. Different kinds of sensing units SUa, SUb, SUc, and SUd included in each sensing unit group SU may be independently driven to output the sensing signals.

The sensing units SUa, SUb, SUc, and SUd included in one sensing unit group SU may be disposed in a generally quadrangular shape as shown in FIG. 1. However, the four sensing units SUa, SUb, SUc, and SUd included in one sensing unit group SU may may be arranged in various other layouts or shapes. For example, the sensing units SUa, SUb, SUc, and SUd included in one sensing unit group SU may also be arranged in a line in a column direction or row direction.

The plurality of sensing units SUa, SUb, SUc, and SUd include a first sensing unit SUa connected with the first scanning signal line group (Ga1, Ga2, . . . ), a second sensing unit SUb connected with the second scanning signal line group (Gb1, Gb2, . . . ), a third sensing unit SUc connected with the third scanning signal line group (Gc1, Gc2, . . . ), and a fourth sensing unit SUd connected with the fourth scanning signal line group (Gd1, Gd2, . . . ).

The scanning signal lines Ga1, Gb1, Gc1, Gd1, Ga2, Gb2, Gc2, Gd2, . . . may be disposed two by two for every one sensing unit row. For example, one scanning signal line of the first scanning signal line group (Ga1, Ga2, . . . ) and one scanning signal line of the second scanning signal line group (Gb1, Gb2, . . . ) may be disposed directly on or beneath the sensing unit row in which the first and second sensing units SUa and SUb are disposed, and one scanning signal line of the third scanning signal line group (Gc1, Gc2, . . . ) and one scanning signal line of the fourth scanning signal line group (Gd1, Gd2, . . . ) may be disposed directly on or beneath the sensing unit row in which the third and the fourth sensing units SUc and SUd are disposed.

However, the scanning signal lines Ga1, Gb1, Gc1, Gd1, Ga2, Gb2, Gc2, Gd2, . . . may also be disposed by ones or twos or more for every one sensing unit.

The sensing signal lines RO1, RO2, . . . may be disposed by ones for every one sensing unit SU column. In this case, the plurality of sensing units SUa, SUb, SUc, and SUd included in one sensing unit group SU may be connected to the same sensing signal line from among RO1, RO2, . . . . Further, as shown in FIG. 1, the same sensing signal lines RO1, RO2, . . . may extend to pass between the sensing units SUa, SUb, SUc, and SUd included in each sensing unit group SU. However, the sensing signal lines are not limited thereto and may also extend in a column direction from the left side or right side of the sensing unit group SU.

Unlike the configuration shown in FIG. 1, a plurality of sensing signal lines may be positioned per a sensing unit group SU column, and at least two of the sensing units SUa, SUb, SUc, and SUd included in one sensing unit group SU may also be connected to different sensing signal lines.

The sensing units SUa, SUb, SUc, and SUd may be photo sensors generating the sensing signals by sensing a touch or access of an external object, or sensing an image of the external object by using internal light IL generated from the backlight 900. For example, the sensing units SUa, SUb, SUc, and SUd may also sense a touch from an external object by using infrared light, or by using visible light.

Referring to FIG. 2, a sensing unit SUk (k=a, b, c, d, . . . ) according to an exemplary embodiment of the present invention may be one of the sensing units SUa, SUb, SUc, and SUd described above. The sensing unit SUk may include a switching element Qa connected with a scanning signal line Gi and a sensing signal line ROj, and a sensing element Qs and a capacitor Cs connected with the switching element Qa.

The switching element Qa is a three-terminal element such as a thin film transistor or the like, where a control terminal thereof is connected with the scanning signal line Gi, an output terminal is connected with the sensing signal line ROj (j=1 2, . . . ), and an input terminal is connected with the sensing element Qs and the capacitor Cs. The scanning signal line Gi may be any one of the first scanning signal line group (Ga1, Ga2, . . . ), the second scanning signal line group (Gb1, Gb2, . . . ), the third scanning signal line group (Gc1, Gc2, . . . ), and the fourth scanning signal line group (Gd1, Gd2, . . . ) described above, or a sub scanning signal line connected therewith. The switching element Qa may transmit the sensing signal to the sensing signal line ROj according to the scanning signal of the scanning signal line Gi.

Referring to FIG. 2A, the sensing element Qs according to the exemplary embodiment of the present invention is a three-terminal element such as a thin film transistor or the like, where an input terminal thereof receives a source voltage Vs (also referred to as "a first voltage"), a control terminal receives a bias voltage Vb (also referred to as "a second voltage"), and an output terminal is connected with the switching element Qa. The bias voltage Vb may be a sufficiently low or high voltage, like a gate-off voltage, that the sensing element Qs is kept in an off state when the light is not irradiated upon the sensing element Qs.

Referring to FIG. 2B, the sensing element Qs according to another exemplary embodiment may receive the bias voltage Vb at both its input terminal and its control terminal, unlike the exemplary embodiment shown in FIG. 2A.

That is, the sensing element Qs may be diode-connected. Even in this case, the bias voltage Vb may be a sufficiently low or high voltage, like a gate-off voltage, that the sensing element Qs is kept in an off state when the light is not irradiated upon the sensing element Qs.

The sensing element Qs may include a photoelectric material generating photo (leakage) current when the light is irradiated. An example of the sensing element Qs may include a thin film transistor having an amorphous silicon, amorphous silicon-germanium, or polysilicon channel which can generate the photocurrent. The light irradiated upon the sensing element Qs may include exterior light in addition to the internal light IL from the backlight 900.

In the configuration of FIG. 2*a*, two terminals of the capacitor Cs are connected to the switching element Qa and the source voltage Vs, respectively. The capacitor Cs may be charged to the reference voltage Vf applied to the sensing signal line ROj according to the scanning signal of the scanning signal line Gi, or be discharged according to the photocurrent of the sensing element Qs.

The backlight 900 generates the internal light IL such as infrared light, visible light, and the like. The backlight 900 is disposed at the rear side of the display device and generates the internal light IL to be irradiated upon the plurality of sensing units SUa, SUb, SUc, and SUd. For example, the exemplary embodiment of the present invention may use the backlight 900 to generate the infrared light used for sensing the touch of the external object. In this case, when the external object is close to the display device or the sensing area SA, the infrared light from the backlight 900 is reflected from the external object back toward (i.e., to be inputted to) the sensing units SUa, SUb, SUc, and SUd. On the contrary, in the case of using a visible light backlight 900, when the external object is close to the display device or the sensing area SA, the visible light from the backlight 900 is reflected from the external object to be inputted to the sensing units SUa, SUb, SUc, and SUd.

The photo sensor according to the exemplary embodiment of the present invention may sense a kind of light, but may include a plurality of sensing units sensing light having different wavelength bands. For example, one display device may also include an infrared light sensing unit capable of sensing infrared light and a visible light sensing unit capable of sensing visible light. In this case, the infrared light sensing unit and the visible light sensing unit may be alternately arranged.

Referring back to FIG. 1, the scan driver 400 is connected to the scanning signal lines Ga1, Gb1, Gc1, Gd1, Ga2, Gb2, Gc2, Gd2, . . . . The scan driver 400 applies scanning signals which include a combination of a gate-on voltage for turning on the switching element Qa of each of the sensing units SUa, SUb, SUc, and SUd, and a gate-off voltage for turning off the switching elements Qa thereof.

The scan driver 400 may independently transmit the scanning signals to each of the first scanning signal line group (Ga1, Ga2, . . . ), the second scanning signal line group (Gb1, Gb2, . . . ), the third scanning signal line group (Gc1, Gc2, . . . ), and the fourth scanning signal line group (Gd1, Gd2, . . . ), For example, the scan driver 400 may receive a plurality of gate clock signals for controlling output timings of gate-on pulses of the scanning signal line groups (Ga1, Gb1, Gc1, Gd1, Ga2, Gb2, Gc2, Gd2, . . . ), respectively. Accordingly, the first scanning signal line group (Ga1, Ga2, . . . ), the second scanning signal line group (Gb1, Gb2, . . . ), the third scanning signal line group (Gc1, Gc2, . . . ), and the fourth scanning signal line group (Gd1, Gd2, . . . ) may independently transmit the gate-on voltages at different times or at the same time. Further, the plurality of scanning signal lines included in one scanning signal line group may sequentially output each gate-on voltage for a predetermined time unit. In this case, the predetermined time unit may be 1 horizontal period 1H.

The sensing signal processor 500 is connected with the sensing signal lines RO1, RO2, . . . . The sensing signal processor 500 may receive the sensing signals from the sensing signal lines RO1, RO2, . . . to process the received sensing signals and then generate contact information such as whether there is a contact or not, a contact position, shape and size of a contact object.

Referring to FIG. 3, the sensing signal processor 500 according to the exemplary embodiment of the present invention may include an integrator connected to the sensing signal line ROj (j=1, 2, . . . ). Each integrator may include an amplifier AP having an inversion terminal (−), a non-inversion terminal (+) and an output terminal, and a capacitor Cf connected thereto. The inversion terminal (−) of the amplifier AP is connected to the sensing signal line RO, and the capacitor Cf is connected between the inversion terminal (−) and the output terminal. The non-inversion terminal (+) of the amplifier AP is connected to the reference voltage Vf. In more detail, the amplifier AP and the capacitor Cf are current integrators and may integrate current of the sensing signal from the sensing signal line ROj to generate a sensing output signal Vout.

Referring to FIG. 4, a display panel 300 of the display device according to the exemplary embodiment of the present invention may include two display panels 100 and 200 which face each other, and an intermediate layer 3 disposed therebetween. The sensing unit group SU according to the exemplary embodiment of the present invention may be disposed at a lower panel 100 or an upper panel 200. The intermediate layer 3 may be a liquid crystal layer in the case of a liquid crystal display, may be an electrophoretic layer including charged particles in the case of an electrophoretic display, and may include fluids in the case of an electro wetting display. On the contrary, in the case where a display device includes one display panel like an organic light emitting diode display, the sensing unit group SU may be disposed on the display panel or disposed at an encapsulation substrate covering the display panel.

The display device further includes backlight 900 disposed at the bottom of the display panels 100 and 200, and the backlight 900 irradiates internal light IL toward the sensing unit group SU. In the case where the external object is close to the display panel, the internal light IL may be reflected from the external object to be inputted to the sensing unit group SU and thus sensed. A light blocking member 260 is disposed between the sensing unit group SU and the backlight 900 to prevent the internal light IL from being directly irradiated from the backlight 900 to the sensing unit group SU. In this case, exterior light OL emitted from a source other than the backlight 900 may further be irradiated to the sensing unit group SU. More precise contact information may be obtained through a process of removing an effect due to the exterior light OL. The process will be described with reference to a driving method to be described below.

Then, an operation of the photo sensor according to the exemplary embodiment of the present invention will be described with reference to FIGS. 1 to 4.

First, the scan driver 400 applies a gate-on voltage Von to the scanning signal lines Ga1, Gb1, Gc1, Gd1, Ga2, Gb2, Gc2, Gd2, . . . in sequence to turn on the switching element Qa included in the sensing units SUa, SUb, SUc, and SUd. Then, the reference voltage Vf applied to the sensing signal lines RO1, RO2, . . . is transmitted to one terminal of the capacitor Cs, and the capacitor Cs is charged by a difference between the reference voltage Vf and the source voltage Vs. This process is referred to as a reset step or a reset period of the sensing units SUa, SUb, SUc, and SUd.

In a state where the switching element Qa is turned off, when light is irradiated upon the sensing element Qs by the touch of an external object or the like, a photocurrent is generated in the sensing element Qs. Then, a voltage drop occurs in the terminal to which the reference voltage Vf of the capacitor Cs is applied, and the capacitor Cs discharges. On the contrary, when light is not irradiated upon the sensing element Qs (i.e. no touch is occurring), the capacitor Cs is not discharged. This process is referred to as a sensing step or a sensing period of the sensing units SUa, SUb, SUc, and SUd.

At the next reset step, when the gate-on voltage Von is applied to the scanning signal lines Ga1, Gb1, Gc1, Gd1, Ga2, Gb2, Gc2, Gd2, . . . , the switching element Qa is turned on. At the previous sensing step, when a charged voltage of the capacitor Cs is changed due to the touch, the reference voltage Vf is recharged to the reference voltage Vf through the turned on switching element Qa. In this case, the current is generated to the sensing signal lines RO1, RO2, . . . , the sensing signal is generated and the sensing signal may be inputted to the sensing signal processor 500 to be processed. This process is referred to as an output step or an output period. Since the reset of the sensing unit and the output of the sensing signal occur at the same time according to the application of the scanning signal, the reset step may be the output step.

Next, a display device including a photo sensor according to a further exemplary embodiment of the present invention will be described with reference to FIG. 5. Like reference numerals designate like constituent elements as the exemplary embodiment described above and the same description is omitted.

Figure 5:
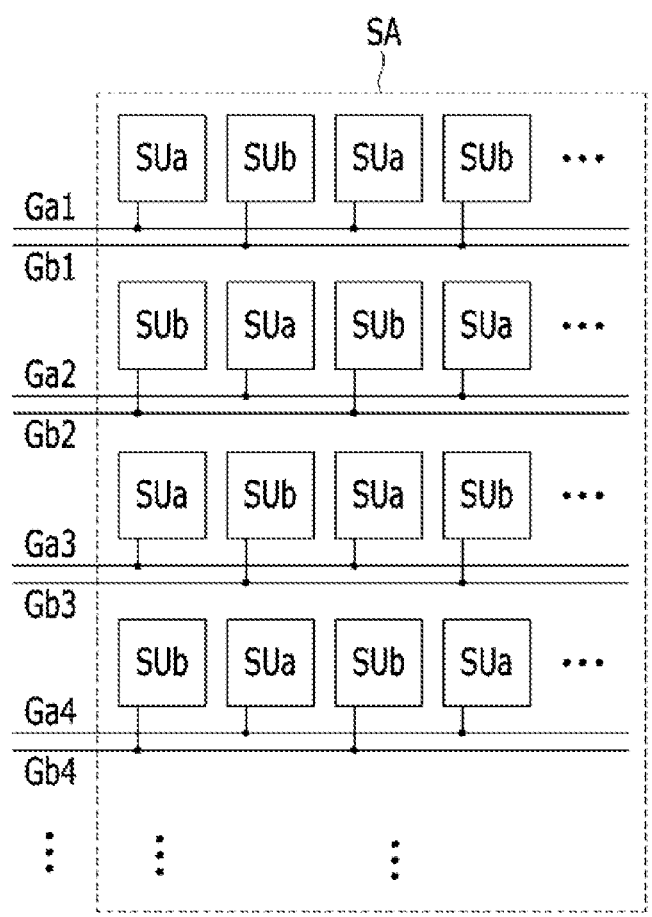
FIG. 5 is a block diagram of a display device including a photo sensor according to the exemplary embodiment of the present invention.

FIG. 5 is a block diagram of a display device including a photo sensor according to a further exemplary embodiment of the present invention.

Referring to FIG. 5, a display device including a photo sensor according to this exemplary embodiment of the present invention is similar to the exemplary embodiment shown in FIGS. 1 to 4, but the number of sensing units included in one sensing unit group SU and kinds of scanning signal lines may be different.

In more detail, a sensing area SA of the display device includes a first scanning signal line group (Ga1, Ga2, . . . ) and a second scanning signal line group (Gb1, Gb2, . . . ) which may independently transmit scanning signals, a first sensing unit SUa connected to the first scanning signal line group (Ga1, Ga2, . . . ), and a second sensing unit SUb connected to the second scanning signal line group (Gb1, Gb2, . . . ).

The first sensing unit SUa and the second sensing unit SUb may be alternately disposed in a row direction and a column direction. The first sensing unit SUa and the second sensing unit SUb which are adjacent to each other may form one sensing unit group SU described above. The adjacent first sensing unit SUa and second sensing unit SUb may also be connected to the same sensing signal line like the exemplary embodiment shown in FIG. 1 and may also be connected to different sensing signal lines (not shown).

In addition, various features of the exemplary embodiment shown in FIGS. 1 to 4 described above may be equally applied thereto.

Next, a driving method of a display device including a photo sensor according to another exemplary embodiment of the present invention will be described with reference to FIGS. 1 to 5, and FIG. 6, but for convenience of the description, the driving method will be described in connection with the configuration shown in FIG. 5, i.e. a photo sensor including two kinds of sensing units SUa and SUb.

Figure 6:
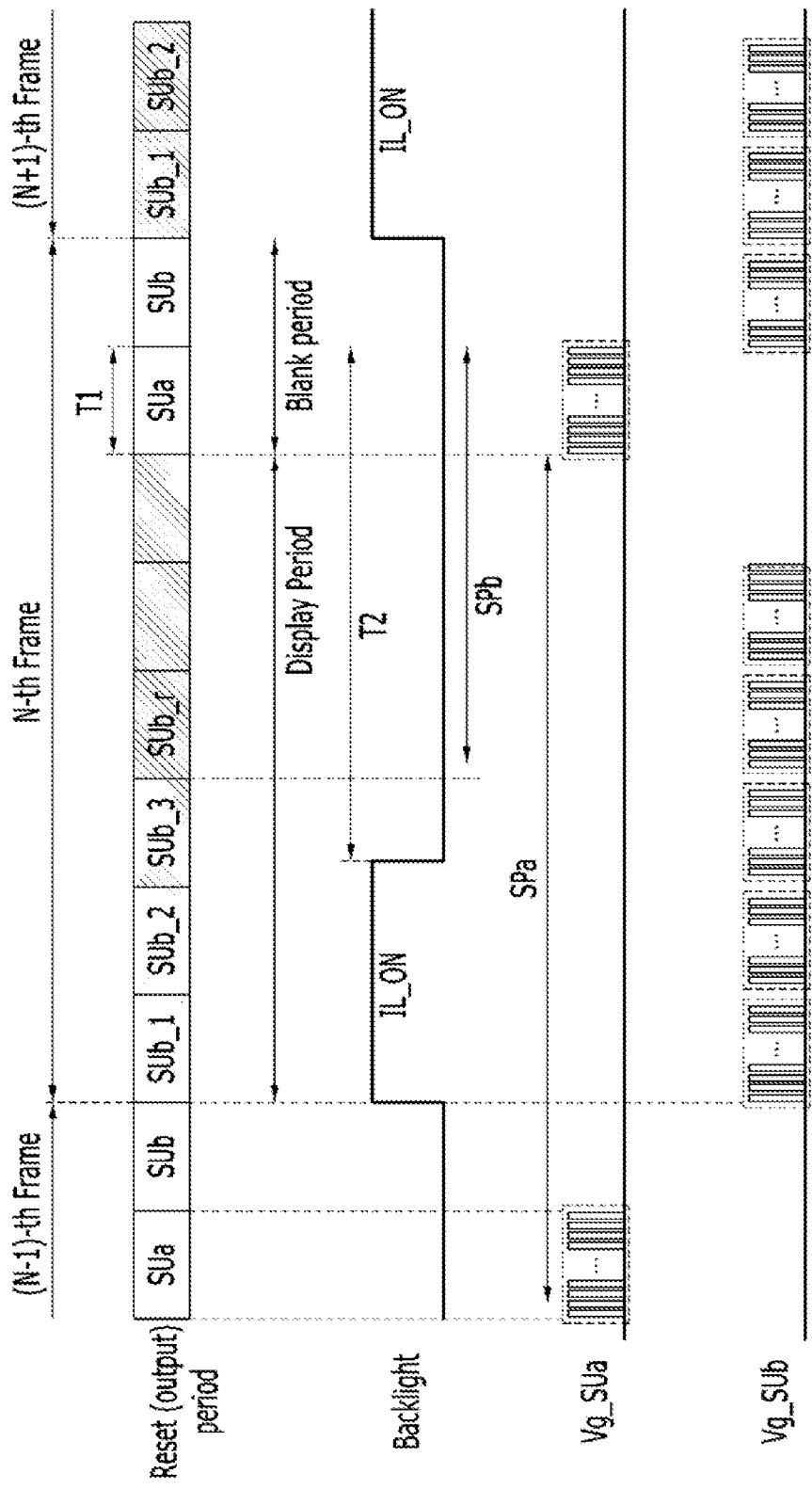
FIG. 6 is a timing diagram illustrating a driving method of a display device including a photo sensor according to another exemplary embodiment of the present invention.

FIG. 6 is a timing diagram illustrating a driving method of a display device including a photo sensor according to another exemplary embodiment of the present invention.

Referring to FIG. 6, the backlight 900 irradiates internal light IL to the display device during an internal light irradiation period IL_ON which is repeated for each frame. A time from a start point of one internal light irradiation period IL_ON to a start point of the next internal light irradiation period IL_ON corresponds to one frame, and a period between the internal light irradiation periods IL_ON of the adjacent frames is an internal light non-irradiation period. FIG. 6 shows the N-th frame and part of the N−1-th and N+1-th frames which are disposed at the front and the rear thereof.

First, in the first sensing unit SUa, a reset step and an output step of the first sensing unit SUa may be performed at the same time. In FIG. 6, a period corresponding to the reset step or the output step of the first sensing unit SUa is represented by the same reference numeral as the first sensing unit SUa and is called a reset period SUa or an output period SUa. A period between the adjacent output periods SUa of the first sensing unit SUa is called a sensing period SPa and has a period corresponding to a sensing step of light. The sensing period SPa shown in FIG. 6 is represented on the basis of the first sensing unit SUa connected to a scanning signal line Ga1 which first receives the scanning signal. The sensing period SPa of the first sensing unit SUa may continue for substantially the duration of one frame.

One output period SUa of the first sensing unit SUa is positioned between two adjacent internal light irradiation periods IL_ON. That is, one output period SUa for the first sensing unit SUa is present in every one frame to generate the sensing signal. The output period SUa of the first sensing unit SUa does not overlap the internal light irradiation period IL_ON, and may be disposed before the internal light irradiation period IL_ON starts, as shown in FIG. 6.

In more detail, the capacitor Cs is recharged with the reference voltage Vf and reset in the output period SUa of the first sensing unit SUa in the N−1-th frame which is positioned before the internal light irradiation period IL_ON of the N-th frame, and then the sensing period SPa of the first sensing unit SUa proceeds. The sensing period SPa may be continued for the same duration as one frame.

An internal light irradiation period IL_ON of the backlight 900 for the N-th frame is disposed in the sensing period SPa of the first sensing unit SUa. One sensing period SPa includes the internal light irradiation period IL_ON and the following internal light IL non-irradiation period. That is, the internal light irradiation period IL_ON may be continued only during a part of the sensing period SPa of the first sensing unit SUa. Only the exterior light OL may be irradiated to the second sensing unit SUb during the internal light IL non-irradiation period of the sensing period SPa.

The sensing period SPa of the first sensing unit SUa ends when the output period SUa of the first sensing unit SUa of the N-th frame starts. In the output period SUa of the first sensing unit SUa, the capacitor Cs is recharged to the reference voltage Vf and simultaneously, the sensing signal may be generated if the voltage of the capacitor Cs was changed during the previous sensing period SPa. Thus, a contact occurring during the previous sensing period SPa may be acquired during the current output period SUa by using the sensing signal.

A duration time T1 of each output period SUa of the first sensing unit SUa may be substantially the same as a time taken to apply a scanning signal Vg_SUa to all the scanning signal lines Ga1, Gb1, Ga2, Gb2, . . . of the sensing area SA in sequence, but is not limited thereto and may also be longer than that time.

Meanwhile, during the sensing period SPa of the first sensing unit SUa, noise may occur in the sensing signal due to the presence of exterior light OL in addition to the internal light IL from the backlight 900. The second sensing unit SUb, which is adjacent or close to the first sensing unit SUa, may be used to remove this noise. This will be described below.

Next, the second sensing unit SUb is reset in at least three periods of reset periods SUb_r and SUb_k and an output period SUb for one frame to generate a sensing signal. That is, the second sensing unit SUb is reset at least three times for one frame to generate the sensing signal. However, in the exemplary embodiment of the present invention, a period in which the sensing signal outputted from the second sensing unit SUb is processed to acquire contact information is called the output period SUb, and a period which is not so is called the reset periods SUb_r and SUb_k (where k=a natural number, the same as above). In the reset periods SUb_r and SUb_k, the capacitor Cs is charged to the reference voltage Vf to reset the second sensing unit SUb without generating the sensing signal or acquiring the contact information.

The output period SUb of the second sensing unit SUb is positioned between adjacent internal light irradiation periods IL_ON and does not overlap the internal light irradiation period IL_ON. That is, a time distance T2 between the start point of the output period SUb of the second sensing unit SUb and the end point of the internal light irradiation period IL_ON may be 0 or more. The output period SUb of the second sensing unit SUb may be positioned next to the output period SUa of the first sensing unit SUa.

The reset periods SUb_r and SUb_k of the second sensing unit SUb are positioned before the output period SUb in the corresponding frame.

In one frame, the reset periods SUb_r and SUb_k of the second sensing unit SUb include one main reset period SUb_r and at least one preceding reset period SUb_k. FIG. 6 shows an exemplary embodiment in which three preceding reset periods SUb_1, SUb_2, and SUb_3 are included in one frame.

The main reset period SUb_r is positioned as the last of the plurality of reset periods SUb_r and SUb_k and, here, does not overlap the internal light irradiation period IL_ON (although it may in other embodiments). The main reset period SUb_r may be positioned in the sensing period SPa of the first sensing unit SUa.

At least one of the preceding reset periods SUb_1, SUb_2, and SUb_3 precedes the main reset period SUb_r and each may be positioned in sequence. In the exemplary embodiment shown in FIG. 6, the preceding reset periods SUb_1, SUb_2, and SUb_3 may partially overlap the internal light irradiation period IL_ON (here, the first two reset periods Sub_1 and Sub_2 each fully overlap IL_ON, while the third reset period Sub_3 partially overlaps IL_ON, but the invention encompasses embodiments with any relative durations of SUb_1, SUb_2, Sub_3, and IL_ON).

In more detail, the second sensing unit SUb may be reset many times through at least one of the preceding reset periods SUb_1, SUb_2, and SUb_3 and one main reset period SUb_r before entering a sensing period SPb which continues after the main reset period SUb_r ends. The sensing period SPb shown in FIG. 6 is represented on the basis of the second sensing unit SUb connected to a scanning signal line Gb1 which first receives the scanning signal. Accordingly, since the second sensing unit SUb is sufficiently reset before the sensing period SPb, the capacitor Cs may be sufficiently charged to the reference voltage Vf and may sufficiently remove charges remaining in the sensing element Qs.

The second sensing unit SUb may sense the exterior light OL during the sensing period SPb starting after the main reset period SUb_r ends for respective second sensing units SUb. In the case where exterior light is present, the photocurrent flows from the sensing element Qs of the second sensing unit SUb and the capacitor Cs of the second sensing unit SUb may also be discharged. The sensing period SPb shown in FIG. 6 is represented on the basis of the second sensing unit SUb connected to a scanning signal line Gb1 which first receives the scanning signal. The sensing period SPb of the second sensing unit SUb is smaller than one frame. The sensing period SPb of the second sensing unit SUb ends when the next output period SUb starts.

In the output period SUb of the second sensing unit SUb, while the capacitor Cs of the second sensing unit SUb is recharged to the reference voltage Vf, the sensing signal is generated according to the degree of discharging that has occurred during the immediately preceding sensing period SPb. The sensing signal of the second sensing unit SUb outputted from the output period SUb may depend on the existence of the exterior light OL or the intensity thereof.

In the exemplary embodiment, assuming that a difference in the sensing signals of the second sensing unit SUb due to the exterior light OL is mostly unrelated to the irradiation time of the exterior light OL, when subtracting the sensing signal of the output period SUb of the second sensing unit SUb from the sensing signal of the output period SUa of the first sensing unit SUa, the above-described "noise" effect due to exterior light OL may be mostly removed from the sensing signal of the first sensing unit SUa. Accordingly, a sensing signal which is not influenced by the exterior light OL may be acquired, and when the sensing signal is processed to acquire contact information, more exact contact information or a more exact image of the object may be obtained.

The duration time T1 of each of the reset periods SUb_r and SUb_k and the output period SUb of the second sensing unit SUb may be substantially the same as a time taken to apply a scanning signal Vg_SUb to all the scanning signal lines Ga1, Gb1, Ga2, Gb2, . . . of the sensing area SA in sequence, but is not limited thereto and may also be longer than the time.

Meanwhile, in the case where the backlight 900 supplies the internal light IL together with the visible light to the display panel of the display device, one frame shown in FIG. 6 may also be a period for displaying an image. In this case, a period from the start point of the internal light irradiation period IL_ON to the start point of the reset or output period SUa of the first sensing unit SUa, as a display period, may be a period in which a gate-on voltage is applied to all of the image scanning signal lines (not shown) in sequence so as to apply image data voltages corresponding to image information for one screen to pixels (not shown).

In the exemplary embodiment of the present invention, since the reset periods SUb_r and SUb_k of the second sensing unit SUb are positioned in the display period, the generated sensing signal may include noise due to various driving signals for displaying. However, in the reset periods SUb_r and SUb_k, since the second sensing unit is just reset and the contact information is not acquired by using the sensing signal, noise in the contact information largely does not occur. On the contrary, as described above, since the second sensing unit SUb for sensing the exterior light OL goes through many reset steps, the remaining charges of the sensing element Qs activated by the internal light IL or exterior light OL are removed and the capacitor Cs may be sufficiently recharged to the reference voltage Vf, thereby acquiring more exact contact information.

A blank period may be positioned between the display periods of the adjacent frames. In the blank period, the image inputted in the immediately preceding display period may be maintained. In the exemplary embodiment of the present invention, the output period SUa of the first sensing unit SUa and the output period SUb of the second sensing unit SUb are adjacent to each other and may be positioned within the blank period.

Since an image display operation of the display device may be in accordance with various known techniques of the art and is understood to those skilled in the art, a more detailed description of image display is omitted.

The driving method shown in FIG. 6 may also be applied to photo sensors including three kinds of sensing units, or any other number, as described above. For example, in the case where the display device including the photo sensor according to the exemplary embodiment of the present invention includes four kinds of sensing units SUa, SUb, SUc, and SUd, the two sensing units SUa and SUb have a reset or output period once for one frame like the first sensing unit SUa in the exemplary embodiment shown in FIG. 6, and the two sensing units SUc and SUd go through multiple reset steps and an output step for one frame like the second sensing unit SUb in the exemplary embodiment shown in FIG. 6.

In one approach, the four adjacent sensing units SUa, SUb, SUc, and SUd can be successively grouped into three sequential pairs, to be driven like the first sensing unit SUa and the second sensing unit SUb shown in FIG. 6.

For example, with respect to any first frame, the first sensing unit SUa generates a sensing signal influenced by the internal light IL and the exterior light OL through one reset or output period, and the second sensing unit SUb generates a sensing signal due to the exterior light OL through several closely-spaced reset periods and one output period for the first frame, thereby acquiring the contact information for the first frame.

In a second frame immediately following the first frame, the second sensing unit SUb generates a sensing signal influenced by the internal light IL and the exterior light OL through one reset or output period, and the third sensing unit SUc generates a sensing signal due to the exterior light OL through several closely-spaced reset periods and one output period for the second frame, thereby acquiring the contact information for the second frame.

Similarly, in a third frame immediately following the second frame, the third sensing unit SUc generates a sensing signal influenced by the internal light IL and the exterior light OL through one reset or output period, and the fourth sensing unit SUd generates a sensing signal according to the exterior light OL through several closely-spaced reset periods and one output period for the third frame, thereby acquiring the contact information for the third frame.

Next, a driving method of a display device including a photo sensor according to another exemplary embodiment of the present invention will be described with reference to FIGS. 7 and 8. Like reference numerals designate like constituent elements as the exemplary embodiment described above and repetitive description is omitted.

Figure 7:
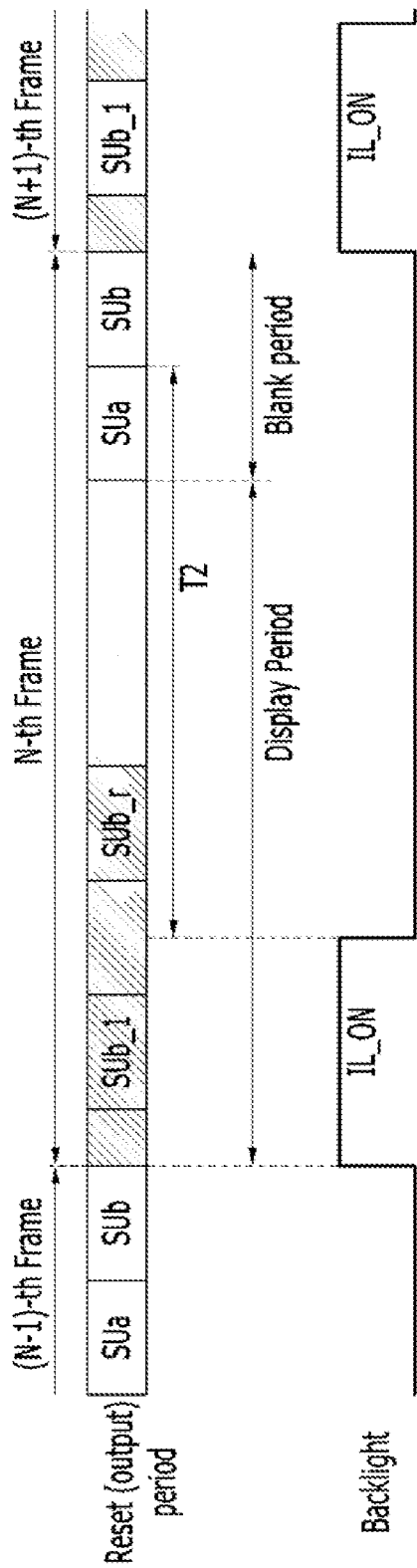
FIG. 7 is another example of a timing diagram illustrating a driving method of a display device including a photo sensor according to another exemplary embodiment of the present invention.
Figure 8:
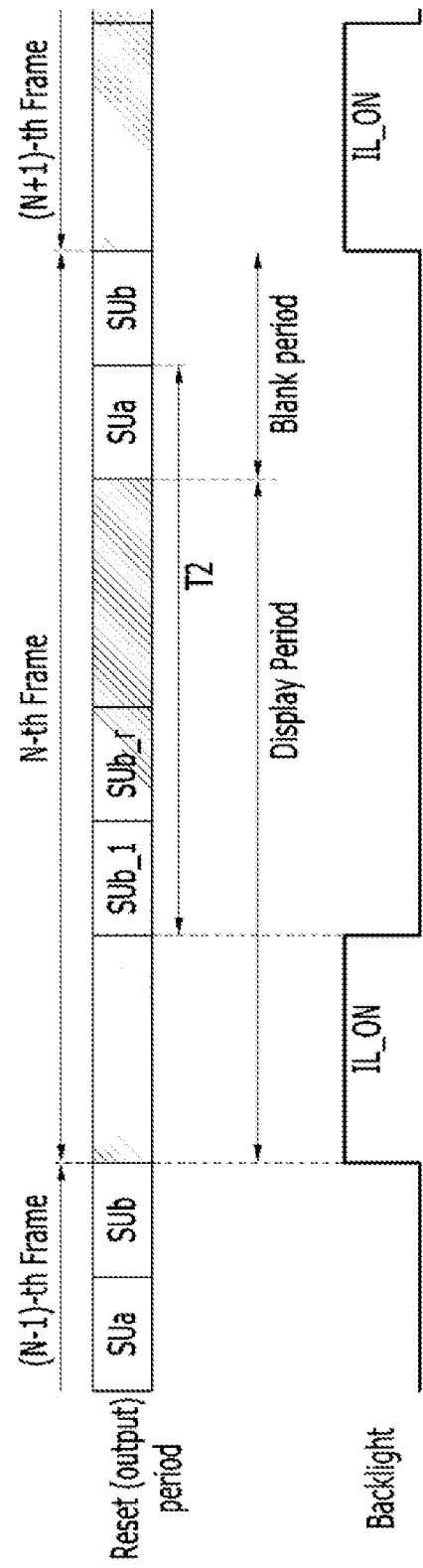
FIG. 8 is another example of a timing diagram illustrating a driving method of a display device including a photo sensor according to another exemplary embodiment of the present invention.

FIG. 7 is an example of a timing diagram illustrating a driving method of a display device including a photo sensor according to another exemplary embodiment of the present invention, and FIG. 8 is an example of a timing diagram illustrating a driving method of a display device including a photo sensor according to another exemplary embodiment of the present invention.

The driving method according to the exemplary embodiment shown in FIGS. 7 and 8 is largely the same as the exemplary embodiment shown in FIG. 6 described above, but the number and positions of preceding reset periods SUb_k of the second sensing unit SUb may vary.

In detail, in the exemplary embodiment shown in FIGS. 7 and 8, the preceding reset period SUb_k of the second sensing unit SUb may include one preceding reset period SUb_1. According to the exemplary embodiment shown in FIG. 7, the preceding reset period SUb_1 may overlap an internal light irradiation period IL_ON. On the contrary, according to the exemplary embodiment shown in FIG. 8, the preceding reset period SUb_1 may not overlap the internal light irradiation period IL_ON. Further, the preceding reset period SUb_1 and the main reset period SUb_r may be temporally separated from each other as shown in FIG. 7 and may be temporally continuous (i.e., one beginning immediately after the other ends) as shown in FIG. 8.

Next, a display device including a photo sensor according to an exemplary embodiment of the present invention and a driving method thereof will be described with reference to FIGS. 9 and 10. Like reference numerals designate like constituent elements as the exemplary embodiment described above and repetitive description is omitted.

Figure 9:
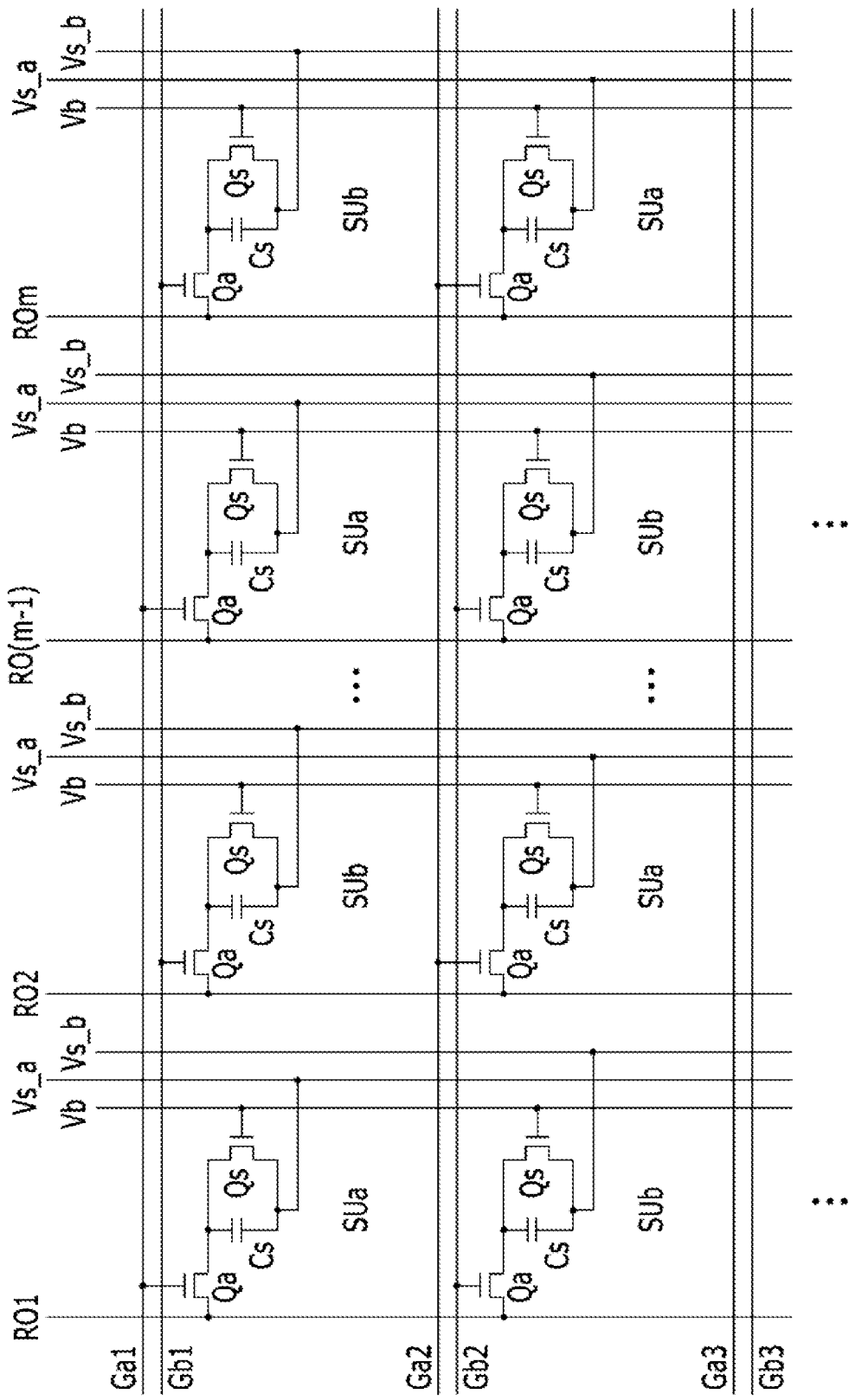
FIG. 9 is a layout view of a photo sensor according to the exemplary embodiment of the present invention.
Figure 10:
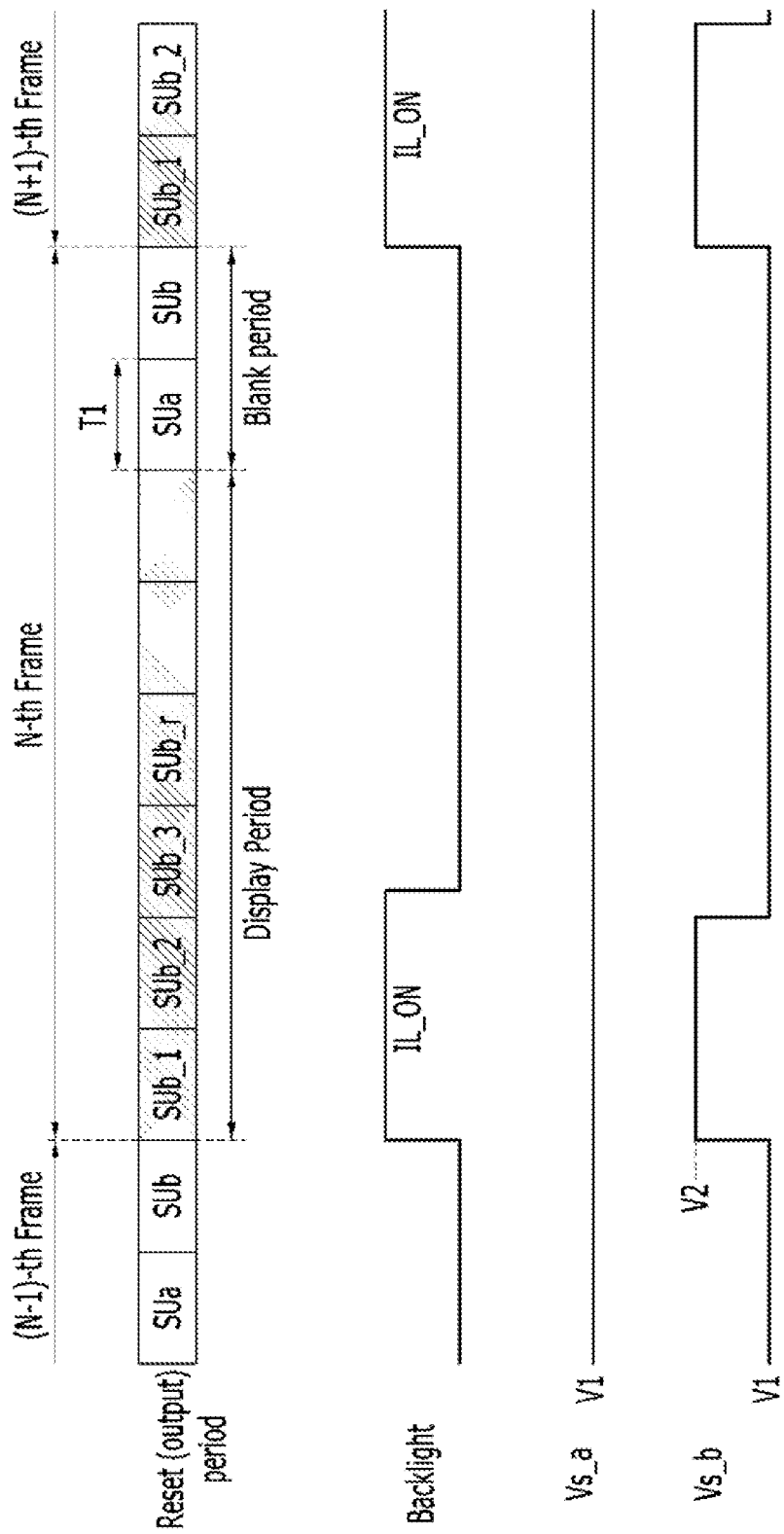
FIG. 10 is another example of a timing diagram illustrating a driving method of a display device including a photo sensor according to another exemplary embodiment of the present invention.

FIG. 9 is a layout view of a photo sensor according to a further exemplary embodiment of the present invention and FIG. 10 is another example of a timing diagram illustrating a driving method of a display device including a photo sensor according to another exemplary embodiment of the present invention.

Referring to FIG. 9, the display device including the photo sensor according to this exemplary embodiment has a similar structure to the exemplary embodiment shown in FIG. 5 described above. In detail, the display device according to this exemplary embodiment includes a first scanning signal line group (Ga1, Ga2, . . . ) and a second scanning signal line group (Gb1, Gb2, . . . ) which may independently transmit scanning signals, a first sensing unit SUa connected to the first scanning signal line group (Ga1, Ga2, . . . ), and a second sensing unit SUb connected to the second scanning signal line group (Gb1, Gb2, . . . ). The first sensing unit SUa and the second sensing unit SUb are arranged in a matrix form and may be alternately disposed (i.e. disposed in alternating manner) in a row direction and/or a column direction.

An internal circuit of the first sensing unit SUa and the second sensing unit SUb is largely the same as the circuit shown in FIG. 2 described above, but the source voltage to which the input terminal of the sensing element Qs of the first sensing unit SUa is connected may be different.

In further detail, the display device according to this exemplary embodiment of the present invention may include a first source voltage line Vs_a and a second source voltage line Vs_b. The first and second source voltage lines Vs_a and Vs_b may extend substantially parallel to sensing signal lines RO1 RO2, . . . , RO m-1, Rom and may cross scanning signal lines Ga1, Gb1, Ga2, Gb2, . . . . An input terminal of the sensing element Qs of the first sensing unit SUa is connected with the first source voltage line Vs_a, and an input terminal of the sensing element Qs of the second sensing unit SUb is connected with the second source voltage line Vs_b. As described above, the second sensing unit Sub is used to remove noise in the signal from first sensing unit Sub resulting from exterior light OL.

Referring to FIG. 10, a driving method of the display device including the photo sensor according to this exemplary embodiment is largely the same as the exemplary embodiment shown in FIG. 6 described above.

The first source voltage line Vs_a transmits a source voltage having a predetermined first voltage level V1 for one frame. The first voltage level V1 may be smaller than the reference voltage Vf transmitted through the sensing signal lines RO1, RO2, . . . . However, the voltage of the second source voltage line Vs_b may be either the first voltage level V1 or a second voltage level V2. The second voltage level V2 has a larger value than the first voltage level V1 and may be the same as the reference voltage Vf. If the reference voltage Vf is applied to the input terminal of the sensing element Qs of the second sensing unit SUb, since a voltage difference between the input-output terminals of the sensing element Qs is 0 V, photocurrent may be minimized when light is irradiated. The first voltage level V1 may be the same as a voltage level of the bias voltage Vb which is applied to a control terminal of the sensing element Qs.

A first period in which the voltage of the second source voltage line Vs_b is the second voltage level V2 may overlap the internal light irradiation period IL_ON of the backlight 900. In more detail, a width of the first period in which the voltage of the second source voltage line Vs_b is the second voltage level V2 may be about 75% or more and about 125% or less of a width of the internal light irradiation period IL_ON. Further, a central axis of the first period and a central axis of the internal light irradiation period IL_ON may coincide with each other or may not coincide with each other, but are close to each other, such that the first period and the internal light irradiation period IL_ON may completely or almost completely overlap each other.

When the voltage difference between the input-output terminals of the sensing element Qs of the second sensing unit SUb during the internal light irradiation period IL_ON is smaller than the voltage difference among other periods, while the internal light IL is irradiated, photo leakage current occurring in the second sensing unit SUb may be minimized. Then, the charge amount remaining in the sensing element Qs of the second sensing unit SUb during the internal light irradiation period IL_ON may be minimized from the first. Therefore, an effect due to the remaining charge amount may be minimized in the sensing period SPb of the second sensing unit SUb and a more exact sensing signal due to the exterior light OL may be acquired, thereby producing more exact contact information.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| <Description of symbols> | |
| --- | --- |
| 3: Intermediate layer | 100, 200, 300: Display panel |
| 260: Light blocking member | 400: Scan driver |
| 500: Sensing signal processor | 900: Backlight |
| IL_ON: Internal light irradiation period | SA: Sensing area |
| | SU: Sensing unit group |
| SPa, SPb: Sensing period | |

What is claimed is:

1. A display device, comprising:
a first sensing unit and a second sensing unit each configured to sense light;
at least one sensing signal line that is connected with the first sensing unit and the second sensing unit and that is configured to transmit a reference voltage for resetting the first sensing unit and the second sensing unit;
a sensing signal processor configured to process a sensing signal from the sensing signal line; and
a backlight configured to irradiate internal light toward the first sensing unit and the second sensing unit during an internal light irradiation period which is repeated per frame,
wherein the first sensing unit is reset once and the second sensing unit is reset at least three times during the same frame.

2. The display device of claim 1, wherein:
the first sensing unit is reset during a first output period which does not overlap the internal light irradiation period, so as to output the sensing signal to the sensing signal line.

3. The display device of claim 2, wherein:
the second sensing unit is reset in at least one preceding reset period, a main reset period, and a second output period which occur sequentially.

4. The display device of claim 3, wherein:
the second output period and the main reset period do not overlap the internal light irradiation period.

5. The display device of claim 4, wherein:
a first sensing period, that is between two adjacent first output periods, overlaps the internal light irradiation period, and
a second sensing period, that is between the main reset period and an adjacent one of the second output periods, does not overlap the internal light irradiation period.

6. The display device of claim 5, further comprising:
a first scanning signal line configured to transmit a scanning signal to the first sensing unit; and
a second scanning signal line configured to transmit a scanning signal to the second sensing unit,
wherein each of the first sensing unit and the second sensing unit includes a switching element connected with the first scanning signal line or the second scanning signal line, and a sensing element and a capacitor that are connected with the switching element, and
wherein when the first sensing unit or the second sensing unit is reset, the reference voltage is transmitted to the sensing element and the capacitor through the switching element.

7. The display device of claim 6, wherein:
an input terminal of the sensing element included in the first sensing unit is connected with a first source voltage line configured to transmit a predetermined first voltage, and
an input terminal of the sensing element included in the second sensing unit is connected with a second source voltage line configured to transmit the first voltage and a second voltage which is different from the first voltage.

8. The display device of claim 7, wherein:
a first period, in which a voltage of the second source voltage line is the second voltage, overlaps the internal light irradiation period.

9. The display device of claim 8, wherein:
the second voltage is substantially equal to the reference voltage.

10. The display device of claim 1, wherein:
the second sensing unit is reset in at least one preceding reset period, a main reset period, and a second output period which occur sequentially.

11. The display device of claim 10, wherein:
the second output period and the main reset period do not overlap the internal light irradiation period.

12. The display device of claim 1, further comprising:
a first scanning signal line configured to transmit a scanning signal to the first sensing unit; and
a second scanning signal line configured to transmit a scanning signal to the second sensing unit,
wherein each of the first sensing unit and the second sensing unit includes a switching element connected with the first scanning signal line or the second scanning signal line, and a sensing element and a capacitor that are connected with the switching element, and wherein when the first sensing unit or the second sensing unit is reset, the reference voltage is transmitted to the sensing element and the capacitor through the switching element.

13. The display device of claim 12, wherein:
an input terminal of the sensing element included in the first sensing unit is connected with a first source voltage line configured to transmit a predetermined first voltage, and an input terminal of the sensing element included in the second sensing unit is connected with a second source voltage line configured to transmit the first voltage and a second voltage which is different from the first voltage.

14. The display device of claim 13, wherein:
a first period, in which voltage of the second source voltage line is the second voltage, overlaps the internal light irradiation period.

15. The display device of claim 13, wherein:
the second voltage is substantially equal to the reference voltage.

16. A method of driving a display device including a first sensing unit and a second sensing unit each configured to sense light, and at least one sensing signal line connected with the first sensing unit and the second sensing unit, the method comprising:
irradiating light from the display device toward the first sensing unit and the second sensing unit during an internal light irradiation period which is repeated for each of a number of frames;
resetting the first sensing unit once during one frame, so as to transmit a reference voltage transmitted from the sensing signal line to the first sensing unit; and
resetting the second sensing unit at least three times during the one frame, so as to transmit the reference voltage to the second sensing unit.

17. The driving method of a display device of claim 16, wherein:
the resetting the first sensing unit is performed during a first output period which does not overlap the internal light irradiation period.

18. The driving method of a display device of claim 17, wherein:
the resetting the second sensing unit is performed in at least one preceding reset period, a main reset period, and a second output period which occur sequentially.

19. The driving method of a display device of claim 18, wherein:
the second output period and the main reset period do not overlap the internal light irradiation period.

20. The driving method of a display device of claim 19, wherein:
a first sensing period, that is between two adjacent first output periods, overlaps the internal light irradiation period, and
a second sensing period, that is between the main reset period and an adjacent one of the second output periods, does not overlap the internal light irradiation period.

21. The driving method of a display device of claim 20, wherein the display device further includes:
a first scanning signal line configured to transmit a scanning signal to the first sensing unit, and
a second scanning signal line configured to transmit a scanning signal to the second sensing unit, wherein each of the first sensing unit and the second sensing unit includes a switching element connected with the first scanning signal line or the second scanning signal line, and a sensing element and a capacitor that are connected with the switching element, and wherein when the first sensing unit or the second sensing unit is reset, the reference voltage is transmitted to the sensing element and the capacitor through the switching element.

22. The driving method of a display device of claim 21, wherein:
an input terminal of the sensing element included in the first sensing unit is connected with a first source voltage line configured to transmit a predetermined first voltage, and an input terminal of the sensing element included in the second sensing unit is connected with a second source voltage line configured to transmit the first voltage and a second voltage which is different from the first voltage.

23. The driving method of a display device of claim 22, wherein:
a first period, in which a voltage of the second source voltage line is the second voltage, overlaps the internal light irradiation period.

24. The driving method of a display device of claim 23, wherein:
the second voltage is substantially equal to the reference voltage.

25. The driving method of a display device of claim 16, further comprising:
a first scanning signal line configured to transmit a scanning signal to the first sensing unit; and
a second scanning signal line configured to transmit a scanning signal to the second sensing unit,
wherein each of the first sensing unit and the second sensing unit includes a switching element connected with the first scanning signal line or the second scanning signal line, and a sensing element and a capacitor that are connected with the switching element, and
wherein when the first sensing unit or the second sensing unit is reset, the reference voltage is transmitted to the sensing element and the capacitor through the switching element.

26. The driving method of a display device of claim 25, wherein:
an input terminal of the sensing element included in the first sensing unit is connected with a first source voltage line configured to transmit a predetermined first voltage, and an input terminal of the sensing element included in the second sensing unit is connected with a second source voltage line configured to transmit the first voltage and a second voltage which is different from the first voltage.

27. The driving method of a display device of claim 26, wherein:
a first period, in which a voltage of the second source voltage line is the second voltage, overlaps the internal light irradiation period.

28. The driving method of a display device of claim 26, wherein:
the second voltage is substantially equal to the reference voltage.

* * * * *